March 28, 1950 C. L. JEFFERS 2,502,154

CARRIER SHIFT RECEIVING SYSTEM

Filed Feb. 15, 1945 2 Sheets-Sheet 1

Inventor
CHARLES L. JEFFERS

By Ralph B. Stewart

Attorney

Inventor

CHARLES L. JEFFERS

By Ralph B. Stewart

Attorney

Patented Mar. 28, 1950

2,502,154

UNITED STATES PATENT OFFICE 2,502,154

CARRIER SHIFT RECEIVING SYSTEM

Charles L. Jeffers, San Antonio, Tex.

Application February 15, 1945, Serial No. 578,080

13 Claims. (Cl. 250—8)

This invention relates to a carrier-shift receiving system and is especially useful for receiving signals from an amplitude modulated transmitter where a second channel of communication is provided by shifting the carrier frequency of the transmitter.

It is known that a second communication channel to convey intelligence from an AM (amplitude modulated) radio broadcasting transmitter may be provided by shifting or varying the carrier frequency of the transmitter in accordance with the intelligence to be transmitted, and there will be no interference with the AM program provided the number of cycles the carrier is shifted is not made too great. If this shift is over 100 cycles, severe distortion can be caused to the AM program due to selective fading between the "mark" and the "space" carrier frequencies of the radio transmitter. The less the amount of the shift, the less the amount of distortion, and if the shift is held to 50 cycles or less, the distortion or degrading of the AM program will not be noticeable.

This small amount of shift results in considerable difficulty at the receiving end in providing equipment which will detect the carrier shift transmissions and translate them into signals or a record of the original information or intelligence transmitted on the second channel. In the first place, drift in the receiving equipment will be considerably greater than the carrier shift unless very elaborate crystal controlled oscillators are used. Even if this precaution is taken there is still the difficulty in maintaining the same relative frequency between the transmitter frequency and the receiver frequency.

An object of my invention is to provide means for detecting the small carrier shift and, in addition, provide means for aligning the frequency of the voltage applied to the detector of this device to the "space" frequency of the transmitter irrespective of the normal drifts in either the transmitter or receiver frequency.

A further object of the invention is to devise a two-channel receiving system for the simultaneous reception of an amplitude modulated signal and a frequency modulated signal on the same carrier, and wherein certain elements of the receiving system are common to the two channels. Specifically, I propose to receive both types of modulation and use common apparatus for amplifying the radio frequency waves, mixing or heterodyning these waves to an intermediate frequency, amplifying the intermediate frequency waves, and then separating the two communication channels. The common portion of the two channels also includes an automatic volume control operated from the second detector of the amplitude modulated channel and serving to control the amplification of the radio frequency amplifiers in the common portion of the two channels.

My invention is illustrated in the accompanying drawing in which

Figure 1:
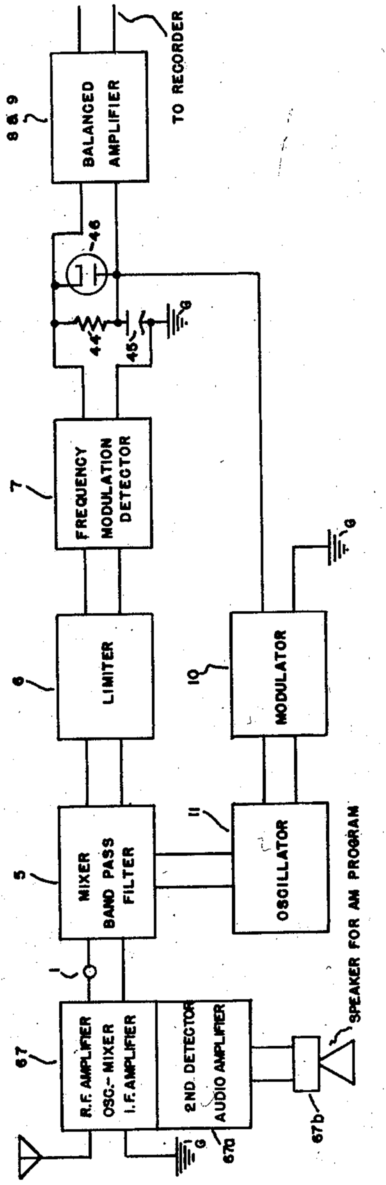
Figure 1 is a block diagram representing a general arrangement of my two-channel receiving system.

Figure 1 illustrates a block schematic diagram of the carrier shift receiving equipment I propose. Any standard superheterodyne receiver 67 can be used to receive the amplitude modulated program and also the carrier-shift signals without special or extensive modifications Terminal 1 of the carrier-shift receiver is connected to an intermediate frequency stage of the receiver 67, preferably to the plate circuit of the last I. F. (intermediate frequency) amplifier stage. To avoid excessive loading or detuning of the I. F. stage, the connection could be made through a small pentode or other tube operating as an isolation amplifier, the grid of this tube being connected to the I. F. circuit and the output secured from the plate of this isolation amplifier.

The superheterodyne receiver 67 can be used in the normal manner without impairment of its operating characteristics for the reception of the AM program. The entire receiver is used for this purpose, including the block 67*a* shown in Figure 1 and representing the second or audio-detector and the audio-amplifying stages of the receiver, as well as the loud speaker represented at 67*b*. Further, full advantage of the receiver's selectivity, R. F. and I. F. amplifying stages, automatic volume control and other features are utilized in the reception of the carrier-shift signals. It will be understood that the automatic volume control of the receiver extends from the second detector in section 67*a* of the receiver and serves to control the amplifying stages in the receiver section 67 which is common to both the AM and FM channels.

The I. F. voltage from 1 is fed into a mixer 5 where it is heterodyned with the voltage from an oscillator 11. Only the difference frequency voltage is passed by the band pass filter or transformer in 5; this voltage should be of a low radio frequency. The ratio between the number of cycles the carrier is shifted and the carrier frequency is increased by the heterodyning action of the first detector of the receiver 67 (provided the carrier frequency of the transmitter is higher than the I. F. frequency of the receiver) and this ratio is further increased by the heterodyning action of the mixer 5 since the output of 5 is at a very low radio frequency. This increased ratio will provide the equivalent of a greater carrier shift and will result in a greater output from the detector in this equipment.

A limiter 6 is provided to eliminate amplitude fluctuations due to the carrier level changing and to limit the amplitude variations due to modulation. So long as the carrier amplitude is greater than the threshold of the limiter 6, the voltage output from the limiter will be relatively constant.

The carrier frequency shift is detected by means of a conventional FM discriminator 7 which provides a direct current voltage proportionate to the frequency deviation from the center frequency or cross-over point of the discriminator. The slight amplitude modulation fluctuations in the carrier level still remaining after the action of the limiter 6 will be cancelled in the discriminator provided the "space" frequency of the input voltage to the discriminator is the center or cross-over frequency of this detector.

Figure 3:
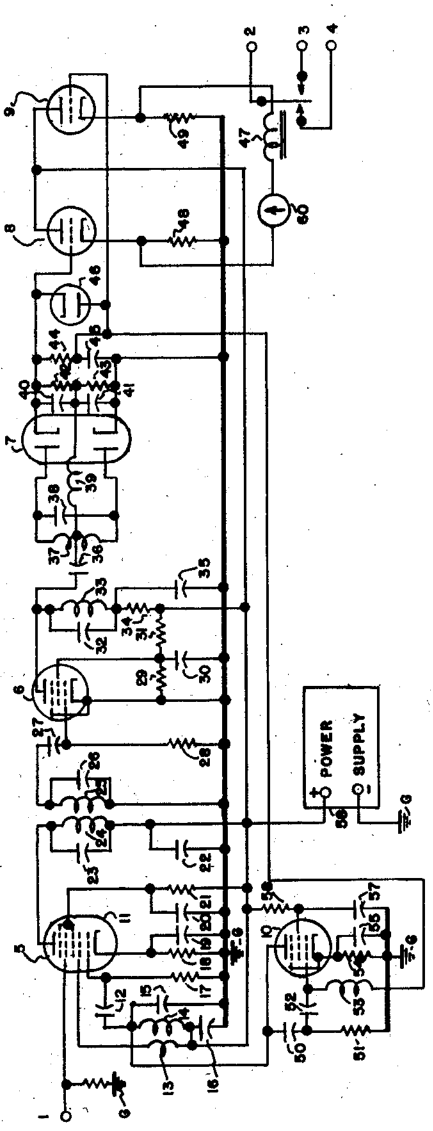
Figure 3 shows one specific embodiment of a receiving arrangement used on the carrier shift channel.

The D. C. output voltage from the discriminator 7 is fed directly to one side of a balanced amplifier circuit 8 and 9. A second voltage is obtained from the output of the discriminator 7 through a network consisting of resistor 44, condenser 45 and diode rectifier 46. This voltage is applied to the other side of the balanced amplifier 8 and 9 and to the modulator 10 controlling the frequency of oscillation of the oscillator 11. The balanced amplifier may assume different forms, and one suitable arrangement is shown in Figure 3 which will be described more fully below. Briefly, the balanced amplifier involves two amplifier tubes 8 and 9 with their outputs connected in opposing relation.

The modulator 10 is arranged so that it will vary the frequency of the oscillator 11 in a manner such that the frequency of the output voltage from the mixer 5 will vary inversely as the frequency which causes the D. C. output voltage from the discriminator 7. Thus, if the H. F. oscillator of the receiver 67, or the oscillator 11, drifts in frequency so that the output frequency from the mixer 5 differs from the cross-over frequency of the discriminator 7. a D. C. voltage will be applied through resistor 44 to the modulator 10. This will vary the frequency of the oscillator 11 to correct for the frequency drift.

Resistor 44 and condenser 45 constitute a time relay filter to prevent rapid fluctuations in the voltage output from the discriminator 7 (due to carrier shift keying) from being applied to the grid of tube 9 or to the modulator 10. This filter will have very slight effect on gradual voltage changes so that the normal frequency changes in the frequency of the transmitter, the receiver 67, or the oscillator 11 will be compensated for by the action of the modulator 10 on the oscillator 11 as a result of relatively slow changes in the voltage output from the discriminator 7. Likewise, this same action applies with regards to tube 9 in the balanced amplifier in that both grids will have the same potential applied to them so long as the voltage output from the discriminator varies slowly. However, a rapid voltage change from the discriminator 7, as would result from carrier shift transmission, will be applied instantly to the grid of tube 8 but not to the grid of tube 9, thus unbalancing the amplifier 8 and 9. These balanced and unbalanced conditions may be utilized to control a recorder or other external signal device.

It is at once apparent that on continuous "mark" and "space" keying, the voltage from the discriminator 7 due to the "mark" frequency will slowly charge condenser 45 towards this D. C. voltage. However, any potential across the condenser 45 is applied to the modulator 10 which varies the frequency of the oscillator 11 in a direction so as to eliminate or reduce to a minimum the potential across condenser 45. In order to prevent the charge on condenser 45 from continuing to increase during periods of continuous keying, I provide for the dissipation of any excess charge on the condenser following each "mark" signal impulse. This is accomplished by connecting a diode rectifier 46 across resistor 44 in a direction such that it will not pass current from voltage derived from the output of discriminator 7 caused by a "mark" signal, but will conduct current in the opposite direction during a "space" signal interval when the output voltage of discriminator 7 falls below the voltage to which condenser 45 has been charged. I select resistor 44 to have a much larger resistance than the internal conducting resistance of the diode 46. The slight tendency for condenser 45 to charge towards the value of the "mark" voltage output from the discriminator 7 is then quickly overcome on the next "space" interval when the voltage from 7 drops below the voltage of condenser 45 and the excess charge on the condenser is dissipated through the lower resistance path of the diode 46. Through the action of the resistor 44 and the diode 46 on the condenser 45 and the resultant action of the voltage across condenser 45 on the frequency of the oscillator 11, as controlled by the modulator 10, the "space" frequency voltage injected into the discriminator 7 will always be very close to the cross-over frequency. In addition, voltages of practically the same values will be applied to the grids of tubes 8 and 9 during the "space" interval but the voltage change due to a "mark" interval will be instantly applied to the grid of tube 8 but not to the grid of tube 9, due to the delaying action of resistor 44 and condenser 45.

Figure 2:
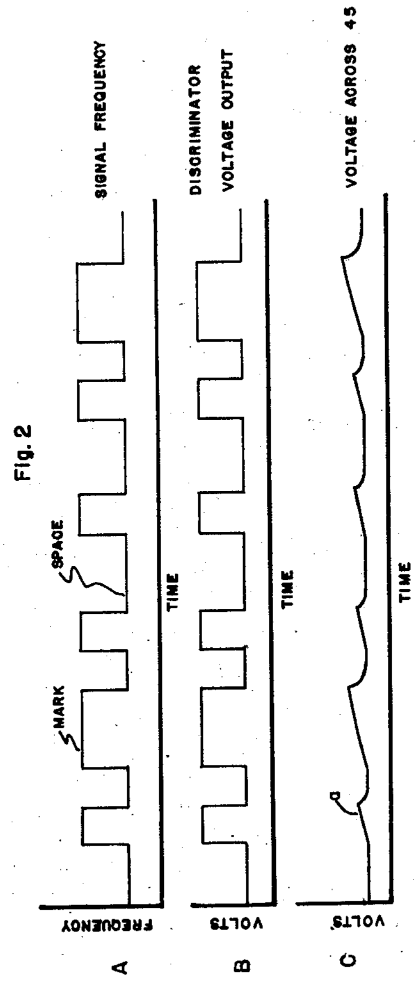
Figure 2 is a series of curves for illustrating the operation of the carrier shift receiving channel.

Figure 2 illustrates graphically the action of resistor 44 and diode 46 with condenser 45 where the voltage output from the discriminator varies due to a shift in the carrier frequency of the received signal. Curve A of Figure 2 illustrates how the carrier frequency of the received signal is shifted from a given value during "space" intervals to a higher frequency for the "mark" signals. Curve B shows how the voltage output from the discriminator is varied due to the frequency shift of the carrier. This output voltage is applied to resistor 44, diode 46 and the grid of tube 8 and is always proportional to the frequency deviation from the cross-over frequency.

Curve C of Figure 2 shows the variation in voltage across condenser 45. This curve is exaggerated in order to show the slight fluctuations of potential across the condenser. For the "space" signal, the potential across condenser 45 is the same as the output of the discriminator but for the first "mark" signal, a dot in this instance, condenser 45 is slowly charged through resistor 44, as shown by the upwardly sloping portion *a*. At the end of the "mark" signal, the output from the discriminator drops to the original potential output which is now less than the potential across condenser 45. The diode 46, being conductive for current flow from condenser 45, quickly reduces the potential across the condenser 45 to the same potential as the output of the discriminator. This same action is repeated for each "mark" frequency pulse.

Figure 3 shows one specific embodiment of my invention. Elements which are common to various figures of the drawing are designated by the same reference numerals throughout. For simplification, I have combined oscillator 11 and mixer 5 into a single pentagrid converter tube (5 and 11). The grid of the mixer or converter part 5 of the pentagrid converter is connected through terminal 1 to the last I. F. stage of a suitable receiver, as explained above for Figure 1. The oscillator section 11 of the pentagrid converter is adjusted to oscillate at a frequency of only a few kilocycles higher or lower than the I. F. frequency of the receiver. The output of the mixer 5 will then contain the numerous frequencies due to the heterodyning action, all of which frequencies are rejected with the exception of the difference frequency in the coupling transformer 23—24—25—26 between the converter stage 5 and the limiter 6. The limiter is used to substantially eliminate amplitude variations in the wave supplied to the discriminator 7. With the limiter set for saturation at a low signal input, practically constant voltage output will be obtained over wide signal variations, provided the signal is always above the threshold point.

The signal is detected in a conventional FM discriminator with the tuned primary circuit 32—33 coupled with the tuned secondary circuit 37—38 and adjusted for resonance at the difference frequency output from the mixer 5. A coupling condenser 36 connects one terminal of primary 33 to the midpoint of secondary 37. The anodes of the double-diode 7 are connected to the secondary circuit, and the two cathodes are joined by resistances 42 and 43 which are shunted by by-pass condensers 40 and 41. A choke coil 39 connects the midpoint of secondary 38 with the midpoint of resistors 42—43. The D. C. output of the discriminator across resistor 42—43 is fed to the control grid of tube 8 of the two-tube balanced bridge amplifier circuit. A second voltage is obtained from the output of the discriminator 7 through resistor 44 and condenser 45 forming a time delay circuit adjusted so that rapid fluctuations in voltage will have little effect, as previously explained. I have obtained good results with a resistance 44 of 1 megohm and condenser 45 of 16 microfarads. Diode rectifier 46 connected across resistor 44 serves to maintain the voltage across resistor 44 very close to the cross-over voltage during the "space" frequency signals but having no effect during the "mark" frequency signals, as already explained. This results, on normal keying, in the potential across the condenser 45 being of such a value that the "space" frequency is the same as the cross-over frequency of the discriminator 7. The voltage across the condenser 45 is applied to the control grid of the other tube 9 in the bridge amplifier. In addition, this same voltage is applied to the control grid of a tube 10 in a variable reactance frequency-control circuit connected across the tuned circuit 14 and 15 of the oscillator section 11 of the pentagrid converter. The reactance frequency-control circuit is so arranged that it will cause the difference frequency of the mixer 5 to vary inversely as the frequency which causes the D. C. output voltage from the discriminator 7.

The frequency control circuit uses a pentode 10, the plate circuit of which is connected through the coil 14 of the oscillator 11 and back to the positive terminal of power supply 58. The plate element of tube 10 is also connected to ground through a condenser 50 and series resistance 51. The control grid of the tube is also connected to ground through condenser 52 and resistance 51. This grid is also connected to the upper terminal of condenser 45 through a choke coil 53. The cathode of tube 10 is connected to ground through resistance 54 which is shunted by a condenser 55, and the screen grid of the tube is connected to the plate supply line by resistance 56 and is connected to ground through condenser 57.

The type of modulator 10 that I have indicated is not the only type which will satisfactorily control the frequency of the oscillator 11. Another type equally suitable would be a small variable condenser across the tuned circuits of the oscillator 11. The capacity of this condenser could be varied by a damped driving mechanism similar to the movement of a D'Arsonval meter without the usual hair spring to return the moving coil to a fixed position when current is removed from the terminals of the meter. The coil would then remain in a fixed position until a current from a voltage across condenser 45 was applied to it which would cause it to move and vary the variable condenser to adjust the frequency of the oscillator 11 until this voltage became zero and the system came to rest.

The bridge amplifier consists of two tubes 8 and 9, the plates of which are in parallel and connected to the positive power potential. The cathodes of these tubes are separately connected to ground through load resistors 48 and 49. The output device, in this case a relay 47, is connected between the cathodes of the two tubes of the bridge or balanced amplifier. Since the control grid of one of the tubes 8 of this amplifier is connected directly to the output of discriminator 7, and the control grid of the other tube 9 is connected to the time delay circuit 44 and 45, which eliminates rapid voltage changes but permits slow voltage changes, the potential between the cathodes of tubes 8 and 9 will vary according to the carrier shift signaling but will be insensitive to gradual voltage changes from the discriminator 7. Since on the "space" portion of the signaling, the grids of both tubes 8 and 8 will be at the same potential, the cathode resistors 48 and 49 should be adjusted so that the relay 47 is held in the "space" position. Now when a "mark" frequency is received, the potential on the grid of tube 8 will instantly change in value to unbalance the currents flowing through the amplifier tubes 8 and 9 pulling the relay 47 to the "mark" position. An indicating meter 60 may be connected in series with relay 47 to aid in setting the amplifier in balanced condition. The external recording device is connected to terminals 2, 3 and 4.

If a calibrated meter is inserted in the cathode of the reactance modulator tube 10, say between the resistor 54 and the ground terminal, it could be used as a tuning indicator. The reading of this meter for zero potential on the control grid of tube 10 would indicate proper alignment of the receiver 67 while any other reading would indicate the direction and the number of cycles the receiver should be retuned.

Figure 4:
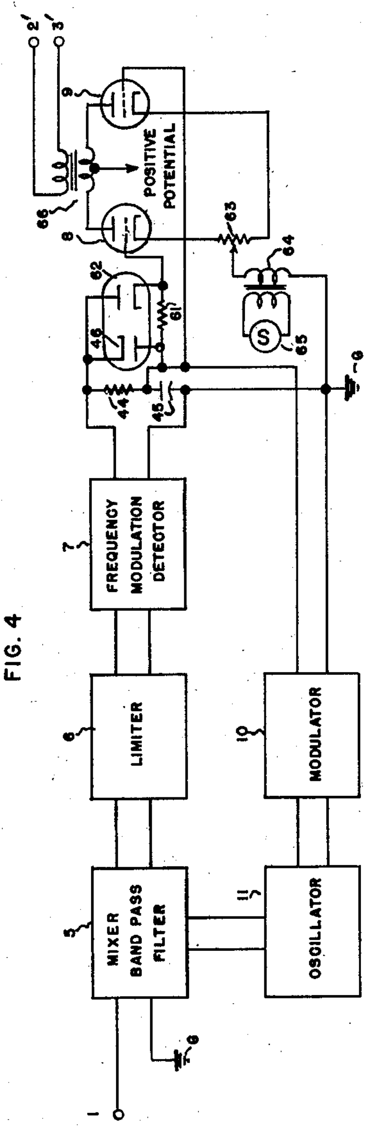
Figure 4 illustrates a modified receiving arrangement for the carrier shift channel.

Figure 4 shows the same arrangement as Figure 3 for the mixer 5, the limiter 6, the discriminator 7, reactance modulator 10 and oscillator 11, but a different arrangement of the circuit of tubes 8 and 9. In this arrangement, tubes 8 and 9 are arranged as a tone keyer having an output tone only when the grids of tubes 8 and 9 have different applied potentials, as for a "mark" frequency.

In this circuit resistor 44, condenser 45 and diode 46 are similar to that shown in the circuit of Figure 3, but to provide more nearly equal potentials on the grids of tubes 8 and 9 during the "space" intervals, resistor 61 and diode 62 are connected in series across diode 46. The grid of tube 8 is connected to the upper terminal of resistor 44 through diode 62 and to the lower terminal of resistor 44 through resistor 61. This arrangement eliminates the time interval constant caused by the fact that since diode 46 has a finite internal resistance, it cannot instantly reduce the potential across the condenser 45 to the same voltage as the output of the discriminator 7 on a "space" frequency impulse following a "mark" impulse. Diode 62 isolates the grid of tube 8 from the upper terminal of resistor 44 during the "space" intervals.

The balanced amplifier of Figure 4 consists of tubes 8 and 9, the cathodes of which are connected together through potentiometer 63. The slider of potentiometer 63 is grounded through the secondary of transformer 64. The primary of the transformer 64 is excited with an audio frequency voltage from source 65. The plates of tube 8 and 9 are connected to transformer 66 so that they operate in push-pull. The secondary of this transformer is connected to the output terminals 2' and 3' to which an external signal device may be connected.

The amplifier of Figure 4 is balanced by adjusting the slider on potentiometer 63 so that no output is obtained when the potential is the same on both grids of tubes 8 and 9 as for a "space" frequency pulse. When the transmitter carrier frequency is shifted to the "mark" position, as described under the description of Figure 3, diode 62 applies a different potential to the grid of tube 8 than is applied to the grid of tube 9. This unbalances the equilibrium of the balanced amplifier and an output tone will be available at the terminals 2' and 3'. On the "space" frequency pulse following the "mark" pulse, the diode 62 will prevent the voltage on the grid of tube 8 from differing from the voltage on the grid of tube 9 since this diode 62 will not conduct current from condenser 45 to the upper terminal of resistor 44, and resistor 61 will maintain the grids of tubes 8 and 9 at the same potential. I chose the resistance of resistor 61 to be much greater than the resistance of resistor 44 or the internal resistance of diode 62. Thus constant adjustment of the balance of the amplifier 8 and 9 will not be necessary as the bridge amplifier will always be in balance during a space frequency impulse from the transmitter.

In both Figures 3 and 4, amplifier tubes 8 and 9 constitute variable impedance devices connected in parallel paths of a balanced bridge circuit in which the output signal circuit is connected to the bridge with the two paths in balanced relation. One of the impedance devices is controlled by voltage from the discriminator which responds instantly to changes in carrier frequency, while the other is controlled by a voltage from the discriminator which is substantially insensitive to sudden changes in frequency but responds to slow changes.

From the foregoing it will be seen that my invention provides a system for receiving on an ordinary superheterodyne receiver and with a simple attachment to this receiver, a second channel of intelligence transmitted by shifting the carrier frequency of the transmitter and at the same time will receive a conventional AM program. It possesses the advantage of not requiring a special receiver or extensive modifications to an existing receiver. Further, since all of the selectivity of the superheterodyne receiver 67 is ahead of the mixer 5 of the adaptor or FM channel, the automatic frequency control will not be affected by signals on adjacent channels which would tend to take over control of the oscillator if the frequency control were applied to the H. F. oscillator of the receiver.

If it is not desirable to use duplexed transmission, this receiving device will provide a means for receiving "mark" and "space" frequency shift transmissions equally well, but the reduced frequency shift would provide greater utilization of the frequency spectrum. The actual band width required for normal transmission speeds would be determined entirely by the selectivity of the superheterodyne receiver.

I claim:

1. In a system for receiving carrier-shift signals wherein the carrier wave shifts from one frequency to another and the received waves are combined with waves from a local oscillator and are detected in a frequency discriminator, the combination of a resistance and a condenser connected in series across the output of said discriminator, said series connected condenser being separate from any condenser embodied in said discriminator, frequency controlling means for said oscillator, a circuit for controlling said frequency control means in accordance with the voltage developed across said series connected condenser, and a rectifier element connected in shunt to said resistance, said discriminator having an output circuit which is balanced at one of said frequencies and produces an output voltage upon receipt of the other frequency, and said output voltage having a polarity which is blocked by said rectifier.

2. In a system for receiving carrier-shift signals wherein the carrier wave is shifted from a "space" frequency to a "mark" frequency and the received waves are combined with waves from a local oscillator and are detected in a frequency discriminator, the combination of a resistance and a condenser connected in series across the output of said discriminator, said series connected condenser being separate from any condenser embodied in said discriminator frequency controlling means for said oscillator, a circuit for controlling said frequency control means in accordance with the voltage developed across said series connected condenser, and a rectifier element connected in shunt to said resistance, the output of said discriminator being substantially balanced on the "space" frequency, and said rectifier being connected in a direction to prevent the flow of current therethrough during receipt of the "mark" frequency.

3. In a system for receiving carrier-shift signals wherein the received waves are combined with waves from a local oscillator and are detected in a frequency discriminator, the combination of a resistance and a condenser connected in series across the output of said discriminator, frequency controlling means for said oscillator, a circuit for controlling said frequency control means in accordance with the voltage developed across said condenser, a rectifier element connected in shunt to said resistance, a pair of amplifier tubes having their plate circuits connected in opposing relation to an output circuit, and connections from the control grids of said tubes to spaced points on said resistance.

4. In a carrier-shift receiving system, the combination of a frequency discriminator having a balanced direct current output circuit, a resistance and a condenser connected in series across said output circuit, a pair of amplifier tubes having their cathodes connected through parallel resistance paths to the terminal of said output circuit to which said condenser is connected, the plate elements of said tubes being connected to a source of plate current, a connection from the control grid of one of said tubes to the other output terminal, a connection from the grid of the second tube to the point of connection between said resistance and said condenser, and a signal device connected between two like electrodes of said tubes.

5. A combination according to claim 4 and including a diode rectifier connected between the control grids of said tubes.

6. In a carrier-shift receiving system, the combination of a frequency discriminator having a balanced output circuit, a resistance and a condenser connected in series across said output circuit, a pair of amplifier tubes having their plate circuits connected in opposing relation to a common output circuit, circuit connections for applying between the control grid and cathode of one of said tubes a potential derived from across said condenser and at least a part of said resistance, and circuit connections for applying between the control grid and the cathode of the other amplifier tube a potential derived from across said condenser alone.

7. In a carrier-shift receiving system, the combination of a frequency discriminator having a balanced output circuit, a resistance and a condenser connected in series across said output circuit, a pair of amplifier tubes having their plate circuits connected in opposing relation to a common output circuit, connections from the cathodes of said tubes to one side of the discriminator output circuit, a connection from the other side of the discriminator output circuit to the control grid of one of said tubes, and a connection from the grid of the second amplifier tube to the point of connection between said resistance and said condenser.

8. A combination according to claim 7 and including a rectifier element connected in shunt to said resistance.

9. A combination according to claim 7 and including a rectifier element connected in shunt to said resistance, a rectifier connected in the grid circuit of said first amplifier tube, and a resistance element connected between the grid of said first amplifier tube and the point of connection between said first resistance and said condenser.

10. In a system for receiving a carrier wave which is shifted in frequency from one value to another at signaling frequency rate, the combination of a frequency discriminator for detecting changes in the frequency of said carrier wave and having a balanced output circuit, means for deriving from said output circuit a first voltage which responds instantly to changes in carrier frequency at signalling frequency rate, a second voltage which is substantially insensitive to changes in frequency of said carrier wave at signaling frequency rate but responds to slow or normal drift changes in carrier frequency, a bridge circuit including a pair of parallel paths each having a variable impedance device included therein, a signal output circuit connected to said bridge circuit in balanced relation with said paths, means for controlling one of said variable impedance paths in accordance with said first voltage, and means for controlling the second variable impedance device in accordance with said second voltage.

11. A combination according to claim 10 and including a source of tone-frequency current for energizing the parallel paths of said bridge.

12. In a system for receiving carrier-shift signals wherein the received waves are combined with waves from a local oscillator and are detected in a frequency discriminator, means for deriving from the output circuit of said discriminator a first voltage which responds instantly to changes in carrier frequency and a second voltage which is substantially insensitive to sudden changes in carrier frequency but responds to slow changes, a bridge circuit having two parallel paths each including a variable impedance device, a signal output circuit connected to said bridge circuit in balanced relation with said parallel paths, means for controlling one of said variable impedance devices in accordance with said first voltage, means for controlling the other variable impedance device in accordance with said second voltage, frequency controlling means for said local oscillator, and means for controlling said frequency control means in accordance with said second voltage.

13. In a carrier-shift receiving system, the combination of a frequency discriminator having a balanced direct current output circuit, a resistance and a condenser connected in series across said output circuit, a pair of amplifier tubes having their cathodes connected through parallel circuits to the terminal of said output circuit to which said condenser is connected, the plate elements of said tubes being connected through parallel paths to a source of plate current, separate connections from the control grids of said tubes to spaced points on said resistance, and a signal device energized from the space current paths of said tubes connected in differential relation.

CHARLES L. JEFFERS.

REFERENCES CITED

The following references are of record in the file of this patent:

UNITED STATES PATENTS

| Number | Name | Date |
|---|---|---|
| 2,084,647 | MacDonald | June 22, 1937 |
| 2,098,286 | Garfield | Nov. 9, 1937 |
| 2,103,847 | Hansell | Dec. 28, 1937 |
| 2,121,287 | Cowan | June 21, 1938 |
| 2,129,085 | Foster | Sept. 6, 1938 |
| 2,165,502 | Peterson | July 11, 1939 |
| 2,211,750 | Humby et al. | Aug. 20, 1940 |
| 2,282,971 | Koch | May 12, 1942 |
| 2,352,918 | Smith | July 4, 1944 |
| 2,356,224 | Crosby | Aug. 22, 1944 |
| 2,357,984 | Travis | Sept. 12, 1944 |
| 2,378,298 | Hilferty | June 12, 1945 |
| 2,403,011 | McLain | July 2, 1946 |
| 2,407,863 | Ziegler | Sept. 17, 1946 |

Certificate of Correction

Patent No. 2,502,154 March 28, 1950

CHARLES L. JEFFERS

It is hereby certified that errors appear in the printed specification of the above numbered patent requiring correction as follows:

Column 2, line 41, after the word "stages" insert a comma; column 3, line 53, for "relay" read *delay*; column 6, line 54, for "and 8" read *and 9*;

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*